United States Patent
Brissette et al.

(10) Patent No.: US 6,698,076 B2
(45) Date of Patent: Mar. 2, 2004

(54) DRIVE SHAFT MANUFACTURING PROCESS

(75) Inventors: Ronald N. Brissette, Lake Orion, MI (US); Dale K. Bell, Troy, MI (US); John L. Bennett, Fraser, MI (US); Michael E. Johnson, Rochester, MI (US); David K. Platner, Shelby, MI (US); Tom Sanko, Troy, MI (US); Jyh-Chiang Wang, Macomb, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 42 days.

(21) Appl. No.: 10/040,877

(22) Filed: Jan. 7, 2002

(65) Prior Publication Data

US 2003/0129022 A1 Jul. 10, 2003

(51) Int. Cl.$^7$ .............................................. B21D 39/00
(52) U.S. Cl. .......................... 29/421.1; 29/521; 29/523; 72/61; 72/370.22; 403/359.1
(58) Field of Search ........................... 403/359.1–359.6; 464/162; 72/61, 363, 370.2, 370.22; 29/421.1, 437, 521, 523

(56) References Cited

U.S. PATENT DOCUMENTS

| | | | |
|---|---|---|---|
| 2,072,090 A | | 3/1937 | Anderson |
| 3,066,503 A | | 12/1962 | Fleming et al. |
| 4,033,020 A | * | 7/1977 | Hudgens .................... 29/149.5 |
| 4,622,840 A | * | 11/1986 | Diffenderfer et al. ......... 72/283 |
| 4,667,530 A | | 5/1987 | Mettler et al. |
| 5,243,874 A | * | 9/1993 | Wolfe et al. .................. 74/493 |
| 5,697,850 A | * | 12/1997 | Yaegashi et al. ............ 464/162 |
| 5,771,737 A | | 6/1998 | Yaegashi |
| 5,951,402 A | * | 9/1999 | Baldwin et al. ............ 464/162 |
| 6,484,384 B1 | * | 11/2002 | Gibson et al. ................ 29/516 |
| 6,543,266 B1 | * | 4/2003 | Jaekel ........................... 72/61 |

FOREIGN PATENT DOCUMENTS

| | | |
|---|---|---|
| DE | 44 27 532 | 3/1995 |
| DE | 195 15 103 | 11/1996 |
| EP | 0 747 605 | 12/1996 |

* cited by examiner

Primary Examiner—Lynne H. Browne
Assistant Examiner—Michael P. Ferguson
(74) Attorney, Agent, or Firm—Carlson, Gaskey & Olds

(57) ABSTRACT

A method of fabricating a driveline assembly including the steps of inserting a first member within a second member, heating the first member to a temperature greater than that of the second member and inserting both members into a die. The inner surface of the die includes an interlocking torque transferring profile. Fluid pressure is applied to the inner diameter of the inner member to expand both members into the profile on the inner surface of the die. The inner and outer members are then removed from the die and cooled such that both members are at a common temperature. Because the inner member was at an elevated temperature, and thereby expanded a greater amount than the outer member, cooling of the members results in a clearance between the members that provides for relative axial movement between the inner and outer members.

8 Claims, 3 Drawing Sheets

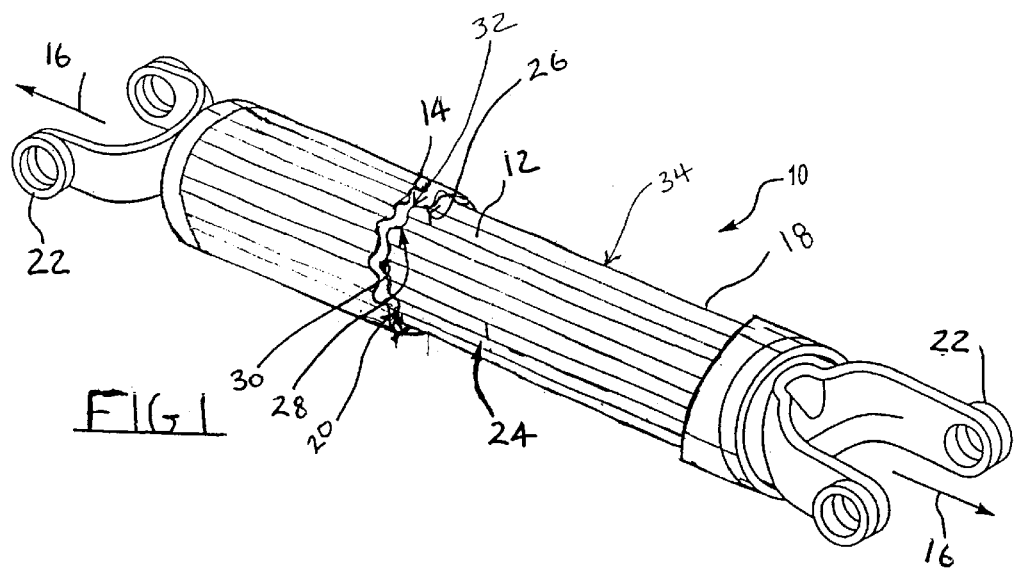
FIG 1
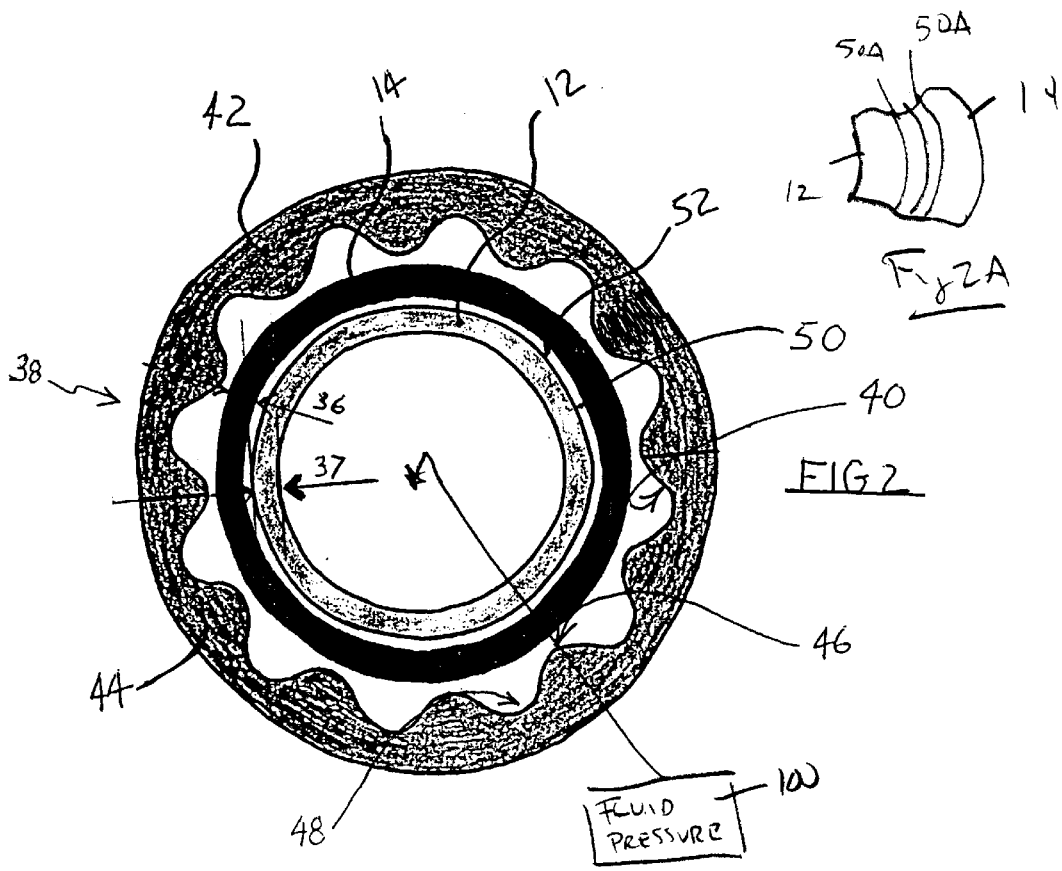
FIG 2
FIG 2A

DRIVE SHAFT MANUFACTURING PROCESS

BACKGROUND OF THE INVENTION

This invention relates to a method of fabricating a drive shaft to accommodate axial movement between a vehicle transmission and a drive axle.

Typically, a driveline for a motor vehicle includes a shaft extending along an axis between a transmission and a differential of a drive axle. Each end of the shaft includes a yoke that forms one portion of a U-joint. The U-joint allows movement of the shaft member to accommodate movement of the drive axle due to road imperfections.

One type of shaft or driveline is designed to further accommodate movement of the drive axle. Typically, such a driveline includes mated first and second mated members slidably disposed relative to each other along a common axis. The first and second members are fabricated from thin walled tubes to form inner and outer interlocking profiles engaged to one another to transmit torque and accommodate axial movement. Clearance between the interlocking profiles is critical to operation of the driveline assembly. Excessive clearance will cause excessive noise and inefficient torque transfer and insufficient clearance prevents the required axial movement between driveline members. A consistent clearance between the first and second interlocking profiles is accomplished in one type of driveline assembly by injecting an elastomeric material between the interlocking profiles at an elevated temperature and then cooling the elastomeric material. The subsequent thermal contraction of the elastomeric material provides the predetermined clearance between the interlocking profiles.

The injection of the elastomeric material is somewhat complex especially for tubes of longer lengths; therefore, it is desirable to develop a method of forming a predetermined clearance between inner and outer interlocking profiles that does not require the use of an elastomeric material.

SUMMARY OF THE INVENTION

An embodiment of this invention is a method of fabricating a driveline assembly including first and second members with interlocking torque transferring profiles formed concurrently to provide a predetermined clearance such that the first and second members are axially movable relative to each other.

The method of this invention includes the steps of inserting a first hollow member within a second hollow member, and placing both members into a die. The die includes an inner surface with an interfitting torque transmitting profile. Pressure applied to an inner diameter of the first member causes the first member to expand into the second member and in turn into the profiled inner surface of the die.

The temperature of the first member is elevated relative to the second member such that the first member has thermally expanded an amount greater than thermal expansion of the second member. With the temperature of the first member elevated above that of the second member the pressure applied to the first member drives the first member outwardly into the second member and further into the inner surface of the die. A pressurized fluid applies pressure to the first member by filling the inner diameter of the first member.

The fluid is then removed and the first and second members removed from the die. Because the first member was at an elevated temperature and had thermally expanded a greater percentage relative to that of the second member, the first member will shrink or contract a greater amount than that of the second member. The difference in the amount that the first member contracts relative to the second member provides the predetermined clearance between the interlocking profiles.

In another embodiment of this method, the interlocking profiles of on the first and second members are formed by way of a die and mandrel. In this embodiment a first tube is placed within a second tube and both placed within a die. The inner surface of the die is in contact with the outer member and includes a shape to form the interlocking profiles. A mandrel including an outer surface shaped to form a mating profile to that of the die is pushed into the first member. Forcing the mandrel into the first member forces the two members to take the shape formed between the die and the mandrel.

Interlocking profiles can be formed along substantially the entire length of the two members are in discrete locations depending on the desired configuration of the driveline.

The method of this invention provides a simple, low cost and reliable method of forming a predetermined and uniform clearance between interlocking profiles such that the members of the driveline are free to move relative to each other along the common axis.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a perspective view of a driveline assembly;

FIG. 2 is a cross-sectional view of inner and outer members disposed within a die;

FIG. 2A is an enlarged cross-section of layers between inner and outer members;

DETAILED DESCRIPTION OF THE PREFERRED EMBODIMENT

Figure 3:
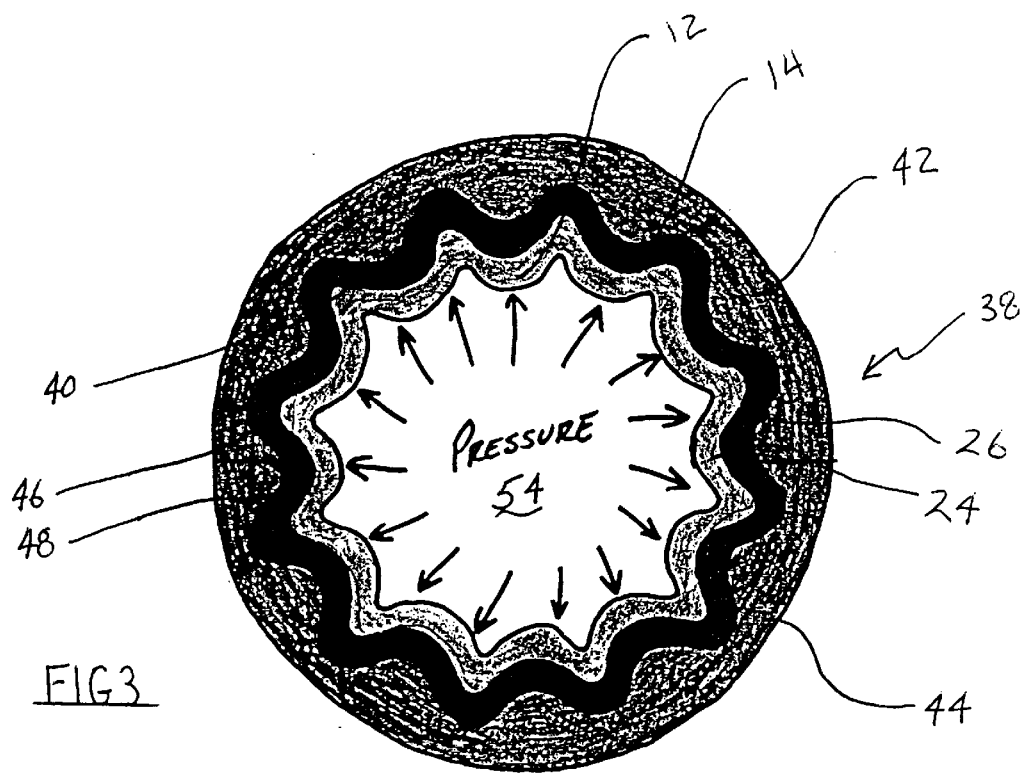
FIG. 3 is a cross-sectional view of the inner and outer members with pressure applied within the inner member.

Referring to the Figures, wherein like numerals indicate like or corresponding parts throughout the several views, a driveline assembly is generally indicated at 10 in FIG. 1. The driveline assembly 10 includes first and second tube members 12,14 interfit about a common axis 16 to transmit torque. Preferably, the first or inner member 12 includes an outer diameter 18 that fits within an inner diameter 20 of the second or outer member 14. Yokes 22, attached to distal ends of the inner and outer members 12,14, provide a connection to a vehicle transmission (not shown) and to a drive axle (not shown). A worker knowledgeable in the art would understand that any type of yoke assembly may be used with this invention and are within the contemplation of this invention. Preferably, the tubes are formed of a suitable metal, and most preferably steel.

The inner and outer members 12, 14 each include interfitting torque-transmitting profiles 24,26. Preferably, each profile 24,26 includes a plurality of sequentially arranged peaks 28 and valleys 30 disposed about a circumference 34 of the first member 12 and an inner surface 32 of the second member 14. The profile 24 of the inner member 12 is smaller than the profile 26 on the inner circumference 32 of the outer member 14 by a predetermined amount such that inner and outer members 12,14 can freely move along the axis 16 relative to each other. Although, a two-piece driveline is shown, it is within the contemplation and scope of this invention to fabricate driveline assemblies having more than two members axially movable relative to each other.

The driveline assembly is fabricated such that the predetermined clearance between the inner and outer tubes 12,14 allows for the proper transmission of torque and a predetermined amount of clearance to allow axial movement between the inner and outer members 12,14. Referring to FIG. 2, the method includes the step of inserting the inner member 12 into the outer member 14. Preferably, inner and outer members 12,14 include common wall thickness 36,37 however, it is within the contemplation of this invention to use members of differing wall thickness. The two interfit members 12,14 are placed into a die 38 including an inner surface 40 with the interfitting torque transmitting profile. Preferably, the die 38 is split into first and second parts 42,44 such that the die 38 may open for placement of the interfit members 12,14 before and after forming. Preferably, the inner surface 40 of the die comprises a series of peaks 46 and valleys 48. The specific shape of the interfitting profile formed on the inner surface 40 of the die 38 may be of any shape designed to transmit torque between the inner and outer members 12,14.

Preferably, a friction-modifying layer 50 fills a space or clearance 52 between the inner and outer members 12,14 to assist the inner and outer members 12, 14 sliding relative to each other. The friction-modifying layer 50 prevents undesirable metal-to-metal contact between the inner and outer tubes. The friction-modifying layer 50 also provides an insulating function to prevent contaminants from entering the clearance between the two members. As appreciated, water intrusion between the two members could degrade the performance of the driveline; therefore, the friction-modifying layer also prevents the intrusion of moisture. The friction-modifying layer may be composed of an elastomeric material composed of an adhesive side adhered to one of the members, and an outer layer with a release agent to allow sliding contact between the members. Further, the friction layer can be composed of separate layers (50A, see FIG. 2A) bonded to each of the members such that friction between the members is reduced, and the members themselves protected from contamination. Teflon can be utilized. As appreciated, it is within the contemplation of this invention that the friction-modifying layer 50 can be composed of any substance as known to one skilled in the art. A fluid pressure source 100 is attached to deliver pressurized fluid into die 38. The fluid supply and appropriate sealing are within the skill of a worker in this art, and form no part of this invention.

Referring to FIG. 3, a fluid 54, from a source 100, under pressure fills the inner member 12 to force inner member 12 to expand outwardly into the outer member 14, and the inner surface 40 of the die 38. The pressure of the fluid 54 is of such a magnitude as to force the expansion of both the inner and outer members 12,14 into the inner surface 40 of the die 38, and further to force the first and second members to take the shape of the inner surface 40 of the die 38. The inner surface 40 of the die 38 includes the series of alternating peaks 46 and valleys 48 that are formed into the first and second members 12, 14, and thereby form the interlocking profiles 24, 26.

The temperature of the inner member 12 is elevated to a level greater than that of the outer member 14 such that the inner member 12 has thermally expanded an amount greater than thermal expansion of the outer member 14. The pressure applied to the inner member 12 drives the inner member 12 outwardly into the outer member 14 and further into the inner surface of the die 38. The temperature of the inner member 12 is preferably elevated by heating the pressurized fluid 54 within the inner member 12 while within the die 38. Note that other methods of heating the inner member 12 as are known in the art are within the contemplation and scope of this invention.

Figure 4:
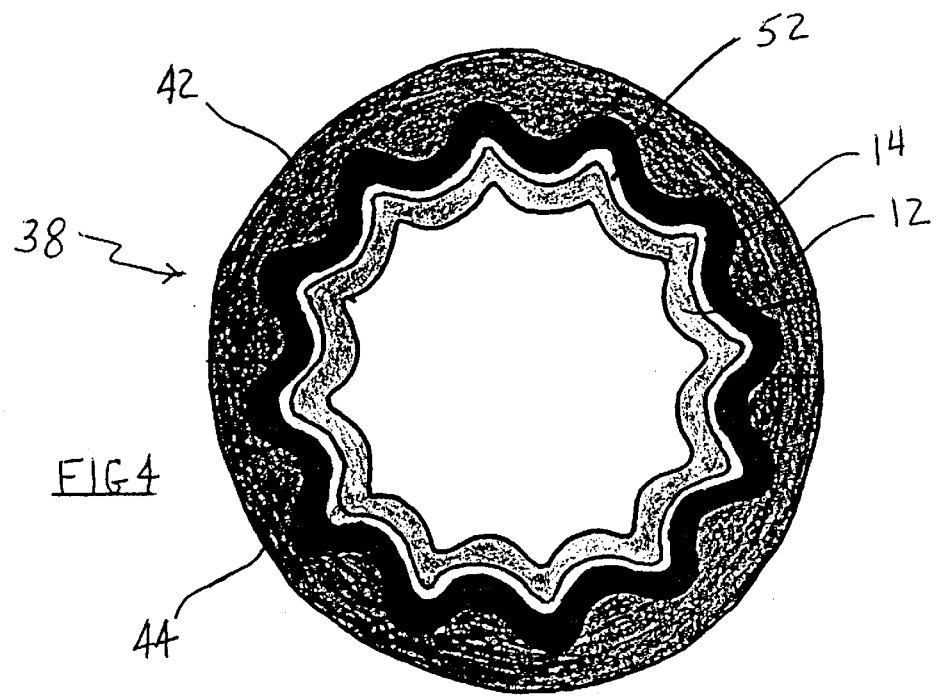
FIG. 4 is a cross-sectional view of the formed inner and outer members within the die.

Referring to FIG. 4, the method continues once the inner and outer members 12,14 have been expanded to form against the inner surface 40 of the die 38. As appreciated, the fluid 54 exerts a force in all directions to form the inner and outer members 12,14 against the inner surface 40 of the die 38 such that each member interlocks with the other. The fluid is then removed, and the inner and outer members 12,14 removed from the die 38. Before the inner and outer members 12,14 are cooled there is no clearance between the two members 12,14. Because the inner member 12 was at an elevated temperature relative to the temperature of the outer member 14 and had thermally expanded a greater percentage relative to that of the outer member 14, the inner member 12 will shrink or contract a greater amount than that of the outer member 14. The difference in the amount that the inner member 12 contracts relative to the outer member 14 provides the predetermined clearance 52 between the interlocking profiles 24,26. The uniformly applied pressure on the inner member 12 results in a uniform clearance between the interlocking profiles 24,26 about the entire contact area. Yoke assemblies 22 are than attached to distal ends of the first and second members to complete the driveline assembly 10. Note that the yoke assemblies 22 can be attached to the inner and outer members by any method known by one skilled in the art.

Figure 5:
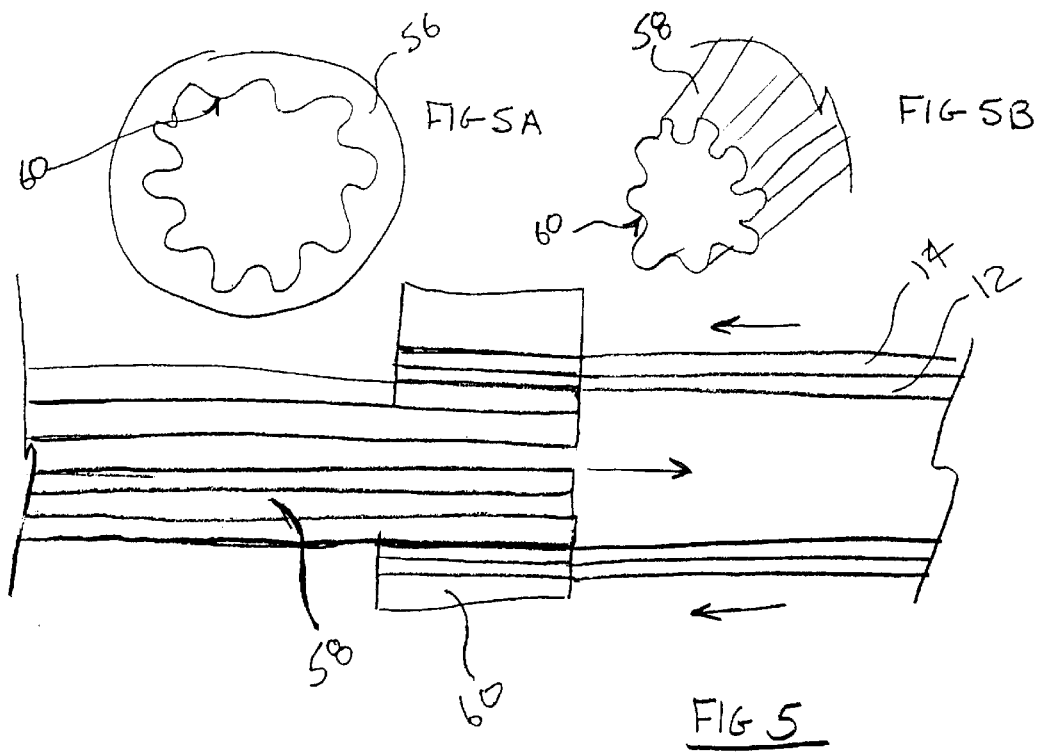
FIG. 5 is a cross-sectional view of a die and mandrel for forming the interlocking profiles.

Referring to FIG. 5, another embodiment of the subject method is disclosed wherein the interlocking profiles are formed by process similar to an extruding process. In this process the inner member 12 is inserted within the outer member 14 in the same manner as the previous embodiment. The two members are then pushed through a die 56 and mandrel 58 to form the final interlocking profile. In this method, heating of the inner member 12 relative to the outer member 14 is accomplished by heat build up from pressure exerted in the metal-to-metal contact between the inner member 12 and the mandrel 58. Referring to FIGS. 5A and 5B, the die 56 and the mandrel 58 include corresponding profiles 60 that create the interlocking profiles 24,26 when the two members 12,14 are pushed between the mandrel 58 and the die 56.

Figure 6:
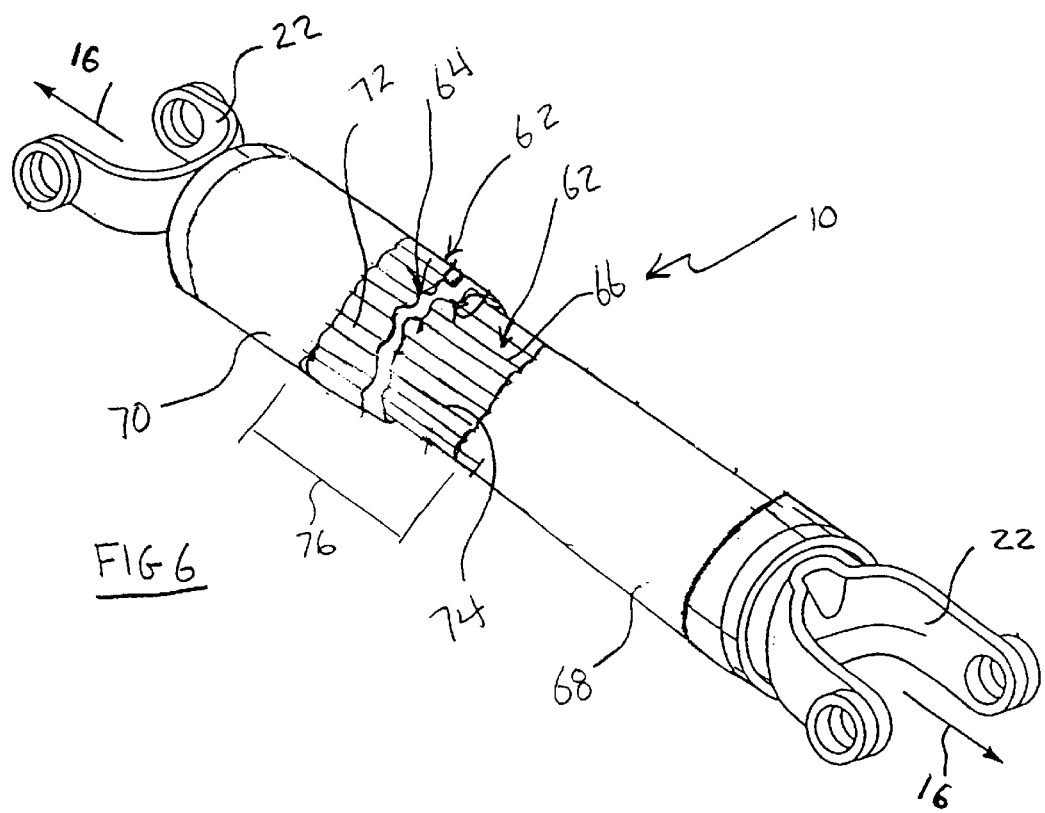
FIG. 6 is a perspective view of a driveline assembly with discretely located interlocking profiles.

Referring to FIG. 6, another embodiment of the subject invention includes the forming of interlocking profiles on each member 68,70 in discrete locations 62, such as at the joint ends 64,66 of each member instead of along the entire length of the driveline 10. The formation of interlocking profiles 72,74 in discrete locations along the driveline assembly 10 eases manufacturing and assembly time. As appreciated, once the driveline 10 is assembled, axial movement between the driveline members 68,70 will be limited to a definable range 76. The interlocking profile 72,74 of each of the members 68,70 can therefore be limited to the definable range 76 of movement along the axis 16.

A layer 50 or layers 50A will be preferably utilized in the FIGS. 5 and 6 embodiments. The layers are not illustrated for simplicity.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of fabricating a drive shaft for a motor vehicle comprising the steps of:
    a. inserting a first hollow member within a second hollow member;
    b. inserting said first and second members into a die;
    c. supplying a pressurized fluid to an inner diameter of said first member such that said first and second members expand into contact with an inner diameter of said die and conform to the shape of said die;
    d. heating said pressurized fluid to a desired temperature of said first member such that said first member is heated by said pressurized fluid to a temperature greater than said second member;
    e. releasing pressure from inside said first member; and
    f. removing said first and second members from said die.

2. The method of claim 1, wherein with said heating of said first member to a temperature higher than said second member, said first member thermally expands a predetermined amount relative to said thermal expansion of said second member.

3. The method of claim 2, wherein said method further includes the step of cooling said first member to a temperature substantially the same as said second member to form a predetermined clearance between said first and second member.

4. The method of claim 1, wherein said inner diameter of said die includes a surface shaped to form an interlocking torque transmitting profile within said first and second members.

5. The method of claim 4, wherein said profile includes a series of peaks and valleys.

6. The method of claim 1, further including the step of applying a layer of material between said first and said second members for modifying friction between said first and second members.

7. The method of claim 6, wherein said friction modifying layer comprises an elastomeric compound.

8. The method of claim 1, wherein said first and second members conform to the shape of said die only in discrete locations along each member.

* * * * *